(12) United States Patent
Schulte

(10) Patent No.: US 6,270,321 B1
(45) Date of Patent: Aug. 7, 2001

(54) SUCTION JET PUMP

(75) Inventor: Franz Schulte, Lippstadt (DE)

(73) Assignee: A. Kayser Automotive Systems GmbH, Einbeck (DE)

(*) Notice: Subject to any disclaimer, the term of this patent is extended or adjusted under 35 U.S.C. 154(b) by 0 days.

(21) Appl. No.: 09/402,553

(22) PCT Filed: Apr. 7, 1998

(86) PCT No.: PCT/EP98/02009
§ 371 Date: Oct. 6, 1999
§ 102(e) Date: Oct. 6, 1999

(87) PCT Pub. No.: WO98/45602
PCT Pub. Date: Oct. 15, 1998

(30) Foreign Application Priority Data

Apr. 10, 1997 (DE) .............................. 197 14 858

(51) Int. Cl.[7] .................................................. F04F 5/52
(52) U.S. Cl. ............................................ 417/186; 417/182
(58) Field of Search ........................... 417/186, 182, 417/174, 187, 151, 164, 80, 198

(56) References Cited

U.S. PATENT DOCUMENTS

| 2,275,627 | * 3/1942 | Hartman ................................ 417/80 |
| 4,380,418 | 4/1983 | Crawford et al. . |
| 4,664,603 | 5/1987 | Priestly . |
| 4,880,358 | * 11/1989 | Lasto .................................... 417/174 |
| 5,024,583 | * 6/1991 | Sasaki et al. ........................ 417/198 |
| 5,611,673 | * 3/1997 | Agata .................................... 417/198 |
| 5,954,481 | * 9/1999 | Baier et al. ........................... 417/182 |

FOREIGN PATENT DOCUMENTS

| 392385 | 3/1924 | (DE) . |
| 4310761C2 | 10/1995 | (DE) . |
| 19512700A1 | 10/1996 | (DE) . |
| 2129516A | 5/1984 | (GB) . |

* cited by examiner

Primary Examiner—Teresa Walberg
Assistant Examiner—Quang Van
(74) Attorney, Agent, or Firm—Richard V. Westerhoff; Eckert Seamens Cherin & Mellott, LLC

(57) ABSTRACT

A sucking jet pump has a tubular casing 1, in which two flow channels 10, 24 are formed. The first flow channel 10 is the sucking jet pump and the second flow channel 24 is a bypass. The first flow channel 10 is formed by a tube 9 which is integrally formed in one piece onto an air branching piece 8. The tube 9 is in air flow connection with the second air supply nipple 14 via a lateral orifice 13. The two flow channels 10, 24 are flow-uncoupled from the first air supply nipple 6 in one direction by means of a nonreturn valve 26, the second flow channel 24 which forms the bypass being additionally closed relative to the air branching piece 8 by means of a second nonreturn valve 25.

18 Claims, 1 Drawing Sheet

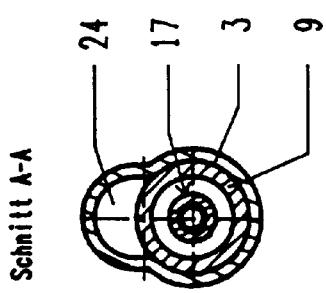
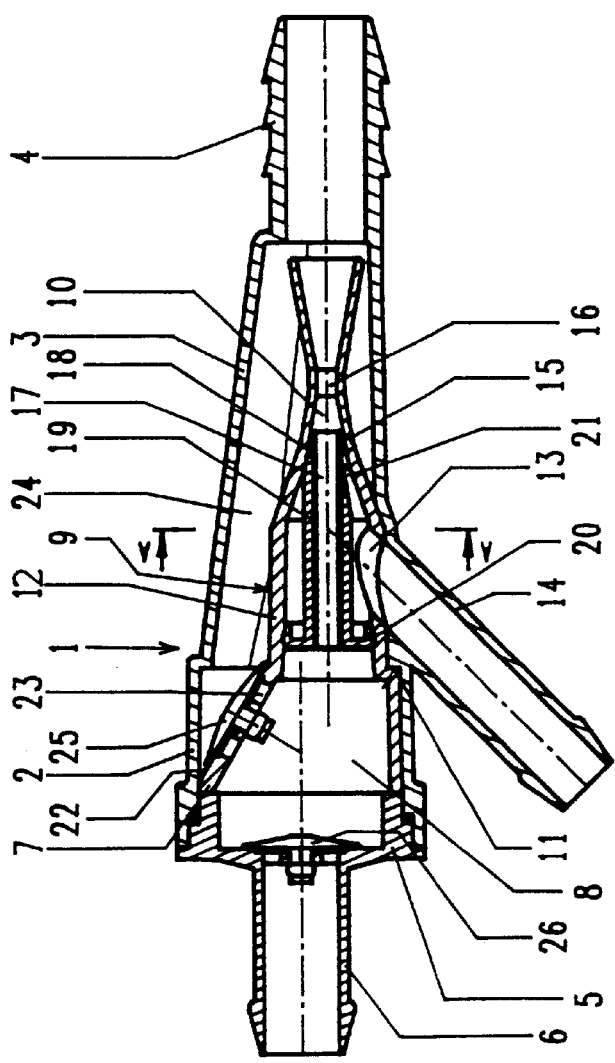

SUCTION JET PUMP

BACKGROUND OF THE INVENTION

1. Field of the Invention

The invention relates to a sucking jet pump having a tubular casing, said pump being described in claim 1.

Sucking jet pumps of the abovementioned type are used in brake booster systems having a vacuum brake booster. In this case, the sucking jet pump is used to increase the vacuum in the brake booster connected to a vacuum generator.

2. Background Invention

In known systems of this type, the sucking jet pump is inserted into a suction line leading from the brake booster to the vacuum generator, in order, as required, to reinforce the suction line of the vacuum generator. For this purpose, the vacuum generator is connected, on the outlet side, to an air supply nipple arranged on the casing of the sucking jet pump, laterally relative to the throughflow direction. By pressurized outlet air from the pressure generator being supplied to the sucking jet pump, the flow is accelerated in the latter and an additional vacuum is generated. In order to prevent pressure equalization between the vacuum generator and the volume of the brake booster, a nonreturn valve is provided between the brake booster and the sucking jet pump in the casing of the latter.

A sucking jet pump designed in this way is known from DE 43 10 761 C2. The action of this known sucking jet pump cannot be criticized, but the casing is difficult to produce, since it forms both flow channels as a result of intermediate walls integrally formed in one piece and the conical path or shape of the first flow channel presents further difficulty in injection molding terms when the individual walls are to have approximately the same thickness. Moreover, a disadvantage of this embodiment of the sucking jet pump is that the entire sucking jet pump has to be modified when its suction capacity is to be varied.

Particularly in order to avoid the last-mentioned disadvantage, it is proposed, in DE 19 512 700 A1, to introduce into the first flow channel a separate nozzle insert which has the cross-sectional narrowing. Nevertheless, in this embodiment, it is still necessary to divide the interior of the casing into two flow channels by arranging inner walls. The separately formed nozzle insert is inserted firmly into one of these two flow channels, sealing relative to the outside. This embodiment of the sucking jet nozzle does not lead to simplified production of the casing and, furthermore, also has the disadvantage that an additional component has to be produced, and introduced into the casing, for the narrowing of the cross section of the first flow channel.

SUMMARY OF THE INVENTION

The object of the invention is to simplify appreciably the design, use and production of a sucking jet pump.

This object and others are achieved by the sucking jet pump of the invention.

A sucking jet pump according to the invention has a tubular casing, the casing having a first air supply nipple at one end and an air discharge nipple at another end and, diverging laterally, a second air supply nipple, two flow channels being designed in the casing, the first flow channel being the jet pump and the second flow channel a bypass, and at least a second flow channel being closed by means of at least one nonreturn valve and an air branching piece being inserted, at the casing end having the first air supply nipple, which air branching piece connects the first air inlet nipple to the two flow channels, the nonreturn valve for the bypass being inserted into the air branching piece, the first flow channel having a portion of reduced cross section and a suction tube insert projecting into the portion of reduced cross section, a tube which forms the first flow channel being integrally formed onto the air branching piece, the tube being in air flow connection with the second air supply nipple by means of a lateral orifice and the suction tube insert being pushed or inserted or slid into the tube from the side of the air branching piece. Appreciable advantages for production by injection molding are thereby afforded. Furthermore, the casing of the sucking jet pump is independent of the choice of the suction capacity desired and, moreover, the number of individual parts and, consequently, the assembly of the sucking jet pump according to the invention are simplified.

In one advantageous embodiment of the invention, the tube which forms the first flow channel rests with the region having the lateral orifice on the adjacent region of the inner wall of the casing so as to shut off the air. This ensures, in a simple and effective way, that the first flow channel is connected to the second air supply nipple in an airtight manner.

In a further advantageous embodiment of the invention, a portion of the pipe which forms the first flow channel first decreases in clear width, as seen in the flow direction, and subsequently widens. Such a Venturi tube arrangement of the first flow duct makes it possible to provide a high vacuum at the first air supply nipple in a simple way. The vacuum is induced by accelerating the air flow in that portion of the first flow channel which forms the Venturi tube region.

In a further advantageous embodiment of the invention, the suction tube insert consists of an outer tube and of an inner tube projecting out of the outer tube, as seen in the flow direction, the outer tube being inserted in a sealing manner, with an outer flange attached to its front end, into the tube which forms the first flow channel, in such a way that said outer tube has air flow connections at its rear end. This design makes it possible to have a simple design, easy installation and a secure fit of the suction tube insert.

In a further advantageous embodiment of the invention, the air branching piece has, in the region of the second flow channel, a plane face which runs obliquely from the outer edge of the front end of the casing as far as the tube forming the first flow channel and which forms the valve seat for the nonreturn valve closing the second flow channel. This makes it possible, along with simple production and construction, to arrange the valve seat of the closing nonreturn valve advantageously for its functioning.

In a further advantageous embodiment of the invention, the first air supply nipple is integrally formed onto a cover closing off the front end of the casing This embodiment of the first air supply nipple has advantageous properties for production by injection molding.

In a further advantageous embodiment of the invention, the first air supply nipple is closed by means of a nonreturn valve. This second nonreturn valve prevents air from flowing out of the sucking jet pump through the first air supply nipple as a result of pressure reversal. Advantageously, this nonreturn valve is placed directly onto the first air supply nipple from inside, so that the two nonreturn valves are connected in series and, consequently, air is prevented in two ways from flowing back through the bypass into the vacuum chamber, and so that, during normal operation when the greatest part of the flow flows through the bypass, the series connection of the two nonreturn valves increases the flow resistance.

In a further advantageous embodiment of the invention, the cover and the casing are designed to be friction-welded. While at the same time ensuring a simple arrangement, an airtight connection is thereby made between the cover and the casing, with the result that advantageous properties in terms of the production and functioning of the sucking jet pump are obtained.

BRIEF DESCRIPTION OF THE DRAWINGS

The invention is described in more detail with reference to an advantageous exemplary embodiment. In the drawing:

FIG. 1 shows a middle longitudinal section through the sucking jet pump, and

FIG. 2 shows a section along the line A—A.

DESCRIPTION OF THE PREFERRED EMBODIMENTS

The casing 1 is of essentially tubular design, the front portion 2 having a circular cross section, and the adjoining portion 3 being essentially oval in cross section and tapering toward the rear. This tapering portion 3 has the air discharge nipple 4 adjoining it. The front portion 2, of circular cross section, of the casing 1 is closed in an airtight manner by means of a cover 5. The first air supply nipple 6 is integrally formed onto this cover 5 so as to extend away in the longitudinal direction of the casing 1.

An elongate one-piece insert part having an axial passage orifice is introduced from the front portion 2, of circular cross section, of the casing 1. This insert part forms, with its rear portion, the air branching piece 8 which has adjoining it a tube 9 forming the first flow channel 10. The air branching piece 8 rests in a sealed manner with its outer surface on the inner surface of the front portion 2, of circular cross section, of the casing 1 and is firmly clamped between an inner shoulder 11 of the casing 1 and the cover 5. In this case, additional sealing, for example by means of an O-ring compression seal, may be provided, in order to make an airtight connection between the outer surface of the air branching piece 8 and the front portion 2 of the casing 1. The air branching piece 8, the first air supply nipple 6, the cover 5 and the adjoining tube 9 may preferably also be designed in one piece or integrally.

The tube 9 adjoining the air branching piece 8 first runs cylindrically and, in this cylindrical portion 12, has a lateral orifice 13 which is located exactly above and on the second air supply nipple 14. That portion 15 of the tube 9 which adjoins the cylindrical portion 12 first runs, with tapering cross section, as far as a narrow point 16 and then widens in the manner of a funnel.

A suction tube insert 17, which is composed of an inner tube 18 and of an outer tube 19, is pushed or inserted into the tube 9 from the air branching piece 8. The inner tube 18 projects out of the outer tube 19 on the downstream side and projects into the narrowing portion of the tube 10. The outer tube 19 has, at its rear end, an outer flange 20, by means of which it is inserted in a sealed manner into the tube 9. That end of the outer tube 19 which is located opposite the flange is supported on the narrowing portion of the tube 9, not in a sealed manner, but so as to leave air flow connections 21 free.

The air branching piece 8 has an obliquely running plane face 22, into which orifices 23 are introduced for air flow connection between the air branching piece 8 and the second flow channel 24 acting as a bypass. This second air flow channel 24 is formed in that the tube 9 has a substantially smaller cross-sectional area than the inner cross-sectional area on the portion 3 of the casing 1.

The orifices 23 in the air branching piece 8 are closed by means of a mushroom-shaped elastic part which forms a nonreturn valve 25 closing the second flow channel 24 and which prevents the possibility of air flowing through the second flow channel 24 into the air branching piece 8. Furthermore, the air supply nipple 6 is closed by means of a further, identically designed nonreturn valve 26 which additionally prevents air from flowing through the second flow channel 24 into the first air supply nipple 6. However, this nonreturn valve 26 also, at the same time, prevents the possibility of air entering the first air supply nipple 6 through the first flow channel 10.

What is claimed is:

1. A sucking jet pump with a tubular casing, the casing having a first air supply nipple at one end and an air discharge nipple at another end and, diverging laterally, a second air supply nipple, two flow channels being designed in the casing, the first flow channel being the jet pump, the second flow channel being a bypass, at least the second flow channel being closed by means of at least one nonreturn valve, an air branching piece being inserted, at that end of the casing which has the first air supply nipple, which the air branching piece connects the first air inlet nipple to the two flow channels, the nonreturn valve for the bypass being inserted into the air branching piece, the first flow channel having a portion of reduced cross section, a suction tube insert projecting into the portion of reduced cross section, a tube which forms the first flow channel being integrally formed onto the air branching piece, the tube being in air flow connection with the second air supply nipple by means of a lateral orifice, and the suction tube insert being inserted into the tube from the side of the air branching piece.

2. The sucking jet pump as claimed in claim 1, with the tube which forms the first flow channel resting with the region having the lateral orifice on the adjacent region of the inner wall of the casing so as to shut off the air.

3. The sucking jet pump as claimed in claim 2 with the portion of the tube which forms the first flow channel first decreasing in clear width, as seen in the flow direction, and then widening.

4. The sucking jet pump as claimed in claim 3 with the suction tube insert consisting of an outer tube and of an inner tube projecting out of the outer tube, as seen in the flow direction, the outer tube being inserted into the tube which forms the first flow channel with an outer flange attached to its front end in a sealing manner and with its rear end having air flow connections.

5. The sucking jet pump as claimed in claim 4 with the air branching piece having, in the region of the second flow channel, a plane face which runs obliquely from the outer edge of the front end of the casing as far as the tube forming the first flow channel and which forms the valve seat for the nonreturn valve closing the second flow channel.

6. The sucking jet pump as claimed in claim 5 with the first air supply nipple being closed by means of a nonreturn valve.

7. The sucking jet pump as claimed in claim 6 with the first air supply nipple being integrally formed onto a cover closing off the front end of the casing.

8. The sucking jet pump as claimed in claim 7 with the cover and the casing being friction-welded.

9. The sucking jet pump as claimed in claim 2, with the air branching piece having, in the region of the second flow channel, a plane face which runs obliquely from the outer edge of the front end of the casing as far as the tube forming the first flow channel and which forms the valve seat for the nonreturn valve closing the second flow channel.

10. The sucking jet pump as claimed in claim 1, with the suction tube insert consisting of an outer tube and of an inner tube projecting out of the outer tube, as seen in the flow direction, the outer tube being inserted into the tube which forms the first flow channel with an outer flange attached to its front end in a sealing manner and with its rear end having air flow connections.

11. The sucking jet pump as claimed in claim 10, with the air branching piece having, in the region of the second flow channel, a plane face which runs obliquely from the outer edge of the front end of the casing as far as the tube forming the first flow channel and which forms the valve seat for the nonreturn valve closing the second flow channel.

12. The sucking jet pump as claimed in claim 11, with the tube which forms the first flow channel resting with the region having the lateral orifice on the adjacent region of the inner wall of the casing so as to shut off the air.

13. The sucking jet pump as claimed in claim 11, with the first air supply nipple being closed by means of a nonreturn valve.

14. The sucking jet pump as claimed in claim 1, with the air branching piece having, in the region of the second flow channel, a plane face which runs obliquely from the outer edge of the front end of the casing as far as the tube forming the first flow channel and which forms the valve seat for the nonreturn valve closing the second flow channel.

15. The sucking jet pump as claimed in claim 14, with the first air supply nipple being closed by means of a nonreturn valve.

16. The sucking jet pump as claimed in claim 1, with the first air supply nipple being closed by means of a nonreturn valve.

17. The sucking jet pump as claimed in claim 1, with the first air supply nipple being integrally formed onto a cover closing off the front end of the casing.

18. The sucking jet pump as claimed in claim 17, with the cover and the casing being friction-welded.

* * * * *